(12) United States Patent
Wang

(10) Patent No.: US 8,165,107 B2
(45) Date of Patent: Apr. 24, 2012

(54) METHOD AND SYSTEM FOR OBTAINING PATH INFORMATION, PATH COMPUTATION ELEMENT

(75) Inventor: Yan Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 324 days.

(21) Appl. No.: 12/603,347

(22) Filed: Oct. 21, 2009

(65) Prior Publication Data

US 2010/0039939 A1 Feb. 18, 2010

Related U.S. Application Data

(63) Continuation of application No. PCT/CN2008/073034, filed on Nov. 12, 2008.

(30) Foreign Application Priority Data

Nov. 26, 2007 (CN) .......................... 2007 1 0167393

(51) Int. Cl.
*H04L 12/28* (2006.01)
(52) U.S. Cl. ......... 370/351; 370/229; 370/230; 370/236
(58) Field of Classification Search .................. 370/229, 370/230, 236, 351

See application file for complete search history.

(56) References Cited

U.S. PATENT DOCUMENTS

| | | | |
|---|---|---|---|
| 2004/0184441 | A1 | 9/2004 | Wu et al. |
| 2006/0039391 | A1 | 2/2006 | Vasseur et al. |
| 2006/0171320 | A1 | 8/2006 | Vasseur et al. |
| 2007/0280199 | A1* | 12/2007 | Rong ........................... 370/351 |

FOREIGN PATENT DOCUMENTS

| | | |
|---|---|---|
| CN | 1859170 A | 11/2006 |
| CN | 101001200 A | 7/2007 |
| CN | 101163105 A | 4/2008 |
| EP | 1460808 A2 | 9/2004 |
| WO | 2006096362 A2 | 9/2006 |

OTHER PUBLICATIONS

State Intellectual Property Office of the People'S Republic of China, Written Opinion of the International Searching Authority in International Patent Application No. PCT/CN2008/073034 (Feb. 26, 2009).
European Patent Office, Extended European Search Report in European Application No. 08854081.0 (Jan. 4, 2010).

* cited by examiner

*Primary Examiner* — Hassan Kizou
*Assistant Examiner* — Ashil Farahmand
(74) *Attorney, Agent, or Firm* — Leydig, Voit & Mayer, Ltd.

(57) ABSTRACT

A method and a system for obtaining path information as well as a PCE are disclosed herein. All the PCEs from the source PCE to the confluent PCE compute the shortest path from the source node to the egress border node of the domain covered by the respective PCE one by one, and send the computation result to the next-hop PCE until the confluent PCE. Meanwhile, all the PCEs from the destination PCE to the confluent PCE compute the shortest path from the destination node to the ingress border node of the domain covered by the respective PCE one by one, and send the computation result to the previous-hop PCE until the confluent PCE. After receiving computation results from the previous-hop PCE and the next-hop PCE, the confluent PCE computes the shortest path between the source node and the destination node, and sends the shortest path to the source PCE.

9 Claims, 3 Drawing Sheets

METHOD AND SYSTEM FOR OBTAINING PATH INFORMATION, PATH COMPUTATION ELEMENT

This application is a continuation of international application number PCT/CN2008/073034 filed Nov. 12, 2008, which claims a priority from the Chinese Patent Application No. 200710167393.5, filed with the Chinese Patent Office on Nov. 26, 2007 and entitled "Method for Obtaining Path Information, Path Computation Element", which is hereby incorporated by reference in its entirety.

FIELD OF THE INVENTION

The present invention relates to network technologies, and in particular, to a method and a system for obtaining path information, and to a Path Computation Element (PCE).

BACKGROUND

Traffic engineering is about optimization of general performance of a network. It aims to provide efficient and reliable network services conveniently, optimize utilization of network resources, and optimize network traffic. Path computation is an important part of the Multi Protocol Label Switch (MPLS) and the General Multi Protocol Label Switch (GMPLS).

In traffic engineering, a Path Computation Client (PCC) generally needs to obtain the shortest path between the source node and the destination node. The source node and the destination node are generally not in the domain covered by one PCE. The domain covered by a PCE may be one of multiple domains in an autonomous system, or may be an autonomous system. FIG. 1 shows PCE network architecture. In FIG. 1, a PCE is responsible for path computation and management of an autonomous system. PCE 1 is responsible for autonomous system 1, PCE 2 is responsible for autonomous system 2, and PCE 3 is responsible for autonomous system 3. Each PCE stores the topological connection relations of all PCEs in the network. When the source node in the autonomous system 1 needs to obtain the shortest path from the source node to the destination node, the method of obtaining the shortest path includes the following steps:

The source node uses itself as a PCC to send a path computation request to PCE 1. PCE 1 generates a PCE sequence from PCE 1 to the destination node according to the topological connection information stored in PCE 1, and sets up a Path Computation Element Protocol (PCEP) connection between PCE 1 and the PCE corresponding to the destination node according to the PCE sequence. PCE 1 transfers the path computation request from PCE 1 to PCE 2 according to the PCE 1 sequence until the path computation request is transferred to PCE 3. After receiving the path computation request, PCE 3 computes a Virtual Shortest Path Tree (VSPT) that uses the destination node as a root and uses the ingress border node of autonomous system 2 as a leaf. PCE 3 sends the computation result to PCE 2. By using the computation result of PCE 3, PCE 2 computes a VSPT that uses the destination node as a root and uses the ingress border node of autonomous system 2 as a leaf. PCE 2 sends the computation result to PCE 1. By using the received computation result, PCE 1 computes the shortest path from the destination node to the source node, and sends the shortest path information to the PCC.

In the foregoing method for the PCC to obtain the shortest path information, the PCEs compute the shortest path one by one, thus making the whole computation process time-consuming.

SUMMARY

A method and a system for obtaining path information as well as a PCE are disclosed in an embodiment of the present invention to shorten the time consumed for obtaining the path information.

A method for obtaining path information is disclosed. The method includes:

computing, by a source Path Computation Element, PCE, a shortest path from a source node to an egress border node in a domain covered by the source PCE after receiving a path computation request, and sending a computation result to a next-hop PCE; and computing, by the next-hop PCE, a shortest path from the source node to an egress border node in a domain covered by the next-hop PC by using the received computation result, and sending a computation result to an another next-hop PCE subsequent to the next-hop PCE until a confluent PCE;

computing, by a destination PCE, a shortest path from a destination node to an ingress border node in a domain covered by the destination PCE after receiving the path computation request, and sending the computation result to a previous-hop PCE; computing, by the previous-hop PCE, a shortest path from the destination node to an ingress border node in a domain covered by the previous-hop PCE by using the received computation result, and sending a computation result to an another previous-hop PCE prior to this previous-hop PCE until the confluent PCE; and computing, by the confluent PCE, a shortest path from the source node to the destination node according to received computation results from a previous-hop PCE and a next-hop PCE, and sending computed shortest path information to the source PCE.

A PCE is disclosed. The PCE includes:

a receiving unit, adapted to receive a path computation request or a computation result;

a computing unit, adapted to perform any one of the following operations: a. compute the shortest path from the source node to the egress border node in a domain covered by the PCE after the receiving unit receives a path computation request; b. compute the shortest path from the destination node to the ingress border node in the domain covered by the PCE after the receiving unit receives the path computation request; c. compute a shortest path from the source node to the egress border node in the domain covered by the PCE by using the computation result received by the receiving unit and sent by the previous-hop PCE; d. compute a shortest path from the destination node to the ingress border node in the domain covered by the PCE by using the computation result received by the receiving unit and sent by the next-hop PCE; and e. compute the shortest path from the source node to the destination node by using the computation result received by the receiving unit and sent by the previous-hop PCE and the computation result received by the receiving unit and sent by the next-hop PCE; and a sending unit, adapted to perform any one of the following operations: f. send the shortest path from the source node to the egress border node in the domain covered by the PCE as a result of computation by the computing unit to the next-hop PCE; g. send the shortest path from the destination node to the ingress border node in the domain covered by the PCE to the previous-hop PCE; and h. send the shortest path between the source node and the destination node to the source PCE.

A system for obtaining path information is disclosed. The system includes:

a source PCE, adapted to: compute the shortest path from the source node to the egress border node in a domain covered by the source PCE after receiving a path computation request, and send the computation result to the next-hop PCE;

a destination PCE, adapted to: compute the shortest path from the destination node to the ingress border node in the domain covered by the destination PCE after receiving a path computation request, and send the computation result to the previous-hop PCE; and a confluent PCE, adapted to: compute the shortest path from the source node to the destination node according to received computation results from a previous-hop PCE and a next-hop PCE, and send the computed shortest path information to the source PCE.

A computer-readable storage medium is disclosed. The storage medium includes computer program codes which are executed by a computer processor and trigger the computer processor to perform operations according to the foregoing method.

Compared with the prior art, in the technical solution under the present invention, all the PCEs from the source PCE to the confluent PCE compute the shortest path from the source node to the egress border node of the domain covered by the respective PCE one by one, and send the computation result to the next-hop PCE until the confluent PCE. Meanwhile, all the PCEs from the destination PCE to the confluent PCE compute the shortest path from the destination node to the ingress border node of the domain covered by the respective PCE one by one, and send the computation result to the previous-hop PCE until the confluent PCE. After receiving computation results from the previous-hop PCE and the next-hop PCE, the confluent PCE computes the shortest path between the source node and the destination node, and sends the shortest path to the source PCE. That is, the computation of the shortest path on both sides of the confluent PCE occurs simultaneously, and the transfer of the computation result occurs simultaneously on both sides. Moreover, the confluent PCE computes the shortest path from the source node to the destination node, and transmits the computation result to the source PCE. By comparison, in the prior art, the PCEs which start from the destination PCE compute the shortest path one by one and transmit the computation result to the previous-hop PCE until the source PCE. Evidently, the method under the present invention shortens the time of computing the shortest path and transmitting the computation result, and shortens the total time required for obtaining the path information.

DETAILED DESCRIPTION

In order to make the technical solution, objectives and merits of the present invention clearer, the present invention is hereinafter described in detail by reference to accompanying drawings and preferred embodiments.

The method for obtaining path information according to an embodiment of the present invention may include:

computing, by a source PCE, the shortest path from a source node to an egress border node in the domain covered by the source PCE after receiving a path computation request, and sending the computation result to the next-hop PCE; and computing, by the next-hop PCE, the shortest path from the source node to the egress border node in the domain covered by the next-hop PCE by using the received computation result, and sending the computation result to the subsequent next-hop PCE until the confluent PCE;

computing, by the destination PCE, the shortest path from the destination node to the ingress border node in the domain covered by the destination PCE after receiving a path computation request, and sending the computation result to the previous-hop PCE; computing, by the previous-hop PCE, the shortest path from the destination node to the ingress border node in the domain covered by the next-hop PCE by using the received computation result, and sending the computation result to the previous-hop PCE until the confluent PCE; and computing, by the confluent PCE, the shortest path from the source node to the destination node according to the received computation results after receiving the computation results from the previous-hop PCE and the next-hop PCE, and sending the computed shortest path information to the source PCE.

The source PCE, confluent PCE, and destination PCE may be specified beforehand, or determined by the source PCE according to its stored network topology information after receiving the path computation request.

Figure 2:
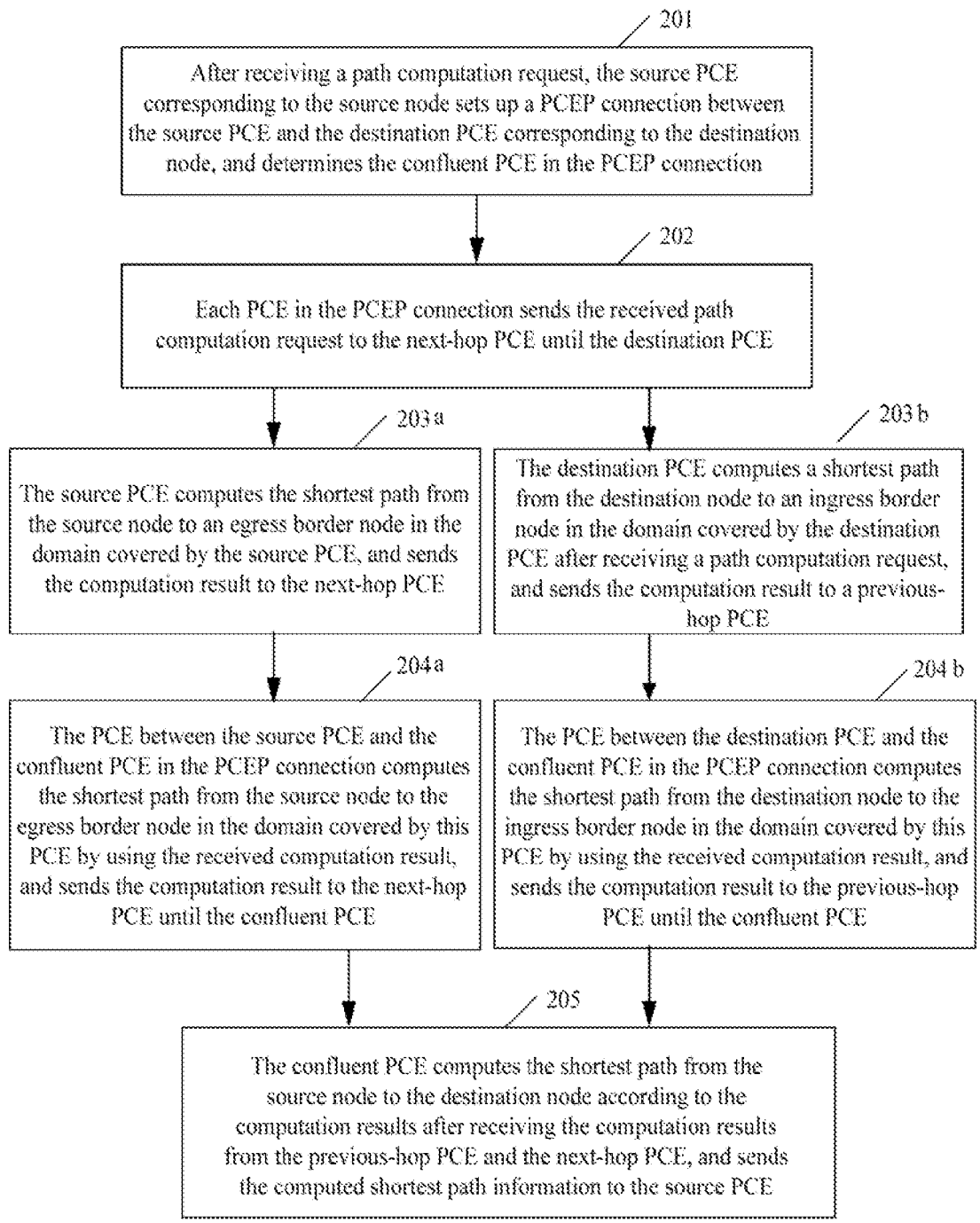
FIG. 2 is a flowchart of a method for obtaining path information according to an embodiment of the present invention.

FIG. 2 is a flowchart of a method for obtaining path information according to an embodiment of the present invention. As shown in FIG. 2, the method includes the following steps:

Step 201: After receiving a path computation request, the source PCE corresponding to the source node sets up a PCEP connection between the source PCE and the destination PCE corresponding to the destination node, and determines the confluent PCE in the PCEP connection.

Before this step, the PCC sends a path computation request to the source PCE. The source PCE may be specified beforehand, or discovered by the PCC automatically through an Interior Gateway Protocol (IGP). The IGP protocol is used by the PCC to discover the existence and computation capability of the PCE, and select the proper PCE for sending the path computation request.

Besides, the PCC may be the source node itself, or a specified path computation agent.

In this step, the process of the source PCE setting up the PCEP connection between the source PCE and the destination PCE corresponding to the destination node may include the following: The source PCE determines the PCE sequence reachable between the source PCE and the destination PCE corresponding to the destination node by using the stored network topology information, sends the PCE sequence to the next-hop PCE next to the source PCE in the PCE sequence through a PCEP message, and continues until the PCEP message is sent to the destination PCE.

In the process of transmitting the PCE sequence, the source PCE may query its routing table that includes the addresses of all PCEs and connection states, and send the received PCEP message which includes the PCE sequence to the next-hop PCE through address matching. In the routing table, the information about the address of the PCE connected to the ingress or egress of every PCE is available. Through this address information, the available next-hop PCE can be found. If a PCE detects that the next-hop PCE in the PCE sequence is unavailable, the PCE may return an error report message (for example, NO-PATH object) to the previous-hop PCE. The NO-PATH object message may be of an additional message type as a result of extending the PCEP protocol.

In the process of transmitting the PCE sequence, the PCEP protocol may be extended, namely, a bidirectional cross-domain path computation flag may be added in the RP object message of the PCEP protocol to indicate that the PCE sequence needs to perform bidirectional cross-domain path computation.

Besides, in the process of transmitting the PCEP message, if a PCE does not support bidirectional cross-domain path computation, the PCE may return an error report message (such as PCEP ERROR object).

The source PCE may determine the PCE in the middle of the PCE sequence as a confluent PCE by using the determined PCE sequence.

Step 202: Each PCE in the PCEP connection sends the received path computation request to the next-hop PCE until the destination PCE.

In this step, the confluent PCE flag may be carried in the path computation request. The PCE that receives the path computation request may determine whether the PCE itself is a confluent PCE according to the confluent PCE flag. The path computation request carries the confluent PCE flag. The PCEP protocol may be extended, namely, a confluent PCE flag is added in the RP object message of the PCEP protocol to specify the confluent PCE.

Alternatively, the confluent PCE flag may be carried in a PCEP message in the process of setting up the PCEP connection.

Step 203*a*: The source PCE computes the shortest path from the source node to an egress border node in the domain covered by the source PCE, and sends the computation result to the next-hop PCE.

Each PCE stores the network topology and resource information of each node in the domain covered by the PCE, and can update the stored network topology and resource information in real time to keep synchronous to all the network nodes. The source PCE determines the shortest path between the source node and the egress border node in the domain covered by the source PCE according to the stored network topology and resource information.

The shortest path may be obtained by computing the VSPT. The source PCE may compute the VSPT in the domain covered by the source PCE, where: the VSPT uses the source node as a root node and uses the egress border node in this domain as a leaf node, the height directed to the leaf node is 2, and the egress border node of the leaf node is the border node connected with the domain covered by the next-hop PCE. The process of setting up the VSPT is based on the prior art, and is not repeated here any further.

In step 201 and step 203*a*, the source node may set up the PCEP connection between the source node and the destination PCE corresponding to the destination node before, at the same time of, or after computing the shortest path between the source node and the egress border node in the domain covered by the source node.

Step 204*a*: The PCE between the source PCE and the confluent PCE in the PCEP connection computes the shortest path from the source node to the egress border node in the domain covered by this PCE by using the received computation result, and sends the computation result to the next-hop PCE until the confluent PCE.

In this step, the PCE that receives the computation result of the previous-hop PCE may compute the shortest path in the way of computing the VSTP. The PCE may compute the VSPT by using the received computation result, where: the VSPT uses the source node as a root node and uses the egress border node in the domain covered by the PCE as a leaf node, the height directed to the leaf node is 2, and the egress border node of the leaf node is the border node connected with the domain covered by the next-hop PCE.

Step 203*b*: The destination PCE computes the shortest path from the destination node to the ingress border node in the domain covered by the destination PCE after receiving a path computation request, and sends the computation result to the previous-hop PCE.

In this step, the destination PCE may compute the VSPT according to the destination node information carried in the path computation request after receiving the path computation request, where: the VSPT uses the destination node as a root node and uses the ingress border node in the domain covered by the PCE as a leaf node, the height directed to the leaf node is 2, and the ingress border node of the leaf node is the border node connected with the domain covered by the previous-hop PCE.

Step 204*b*: The PCE between the destination PCE and the confluent PCE in the PCEP connection computes the shortest path from the destination node to the ingress border node in the domain covered by this PCE by using the received computation result, and sends the computation result to the previous-hop PCE until the confluent PCE.

In this step, the PCE between the destination PCE and the confluent PCE in the PCEP connection may compute the VSPT by using the received computation result after receiving the computation result, where: the VSPT uses the destination node as a root node and uses the ingress border node in the domain covered by this PCE as a leaf node, the height directed to the leaf node is 2, and the ingress border node of the leaf node is the border node connected with the domain covered by the previous-hop PCE.

Step 205: The confluent PCE computes the shortest path from the source node to the destination node according to the computation results after receiving the computation results from the previous-hop PCE and the next-hop PCE, and sends the computed shortest path information to the source PCE.

In this step, the confluent PCE receives the VSPT that uses the source node as a root node from the previous-hop PCE, and receives the VSPT that uses the destination node as a root node from the next-hop PCE, and uses the two VSPTs and the network topology and resource information of the domain covered by the confluent PCE to compute the shortest path from the source node to the destination node.

In this step, the confluent PCE sends the shortest path information to the source PCE through the PCEs between the confluent PCE and the source PCE according to the determined PCE sequence.

The process of step 203*a* and step 204*a* may be performed at the same time when performing the process of step 203*b* and step 204*b*. That is, the process of computing the shortest path from the source PCE to the confluent PCE may be performed at the same time when computing the shortest path from the destination PCE to the confluent PCE.

After obtaining the shortest path information, the source PCE sends the shortest path information to the PCC.

Figure 1:
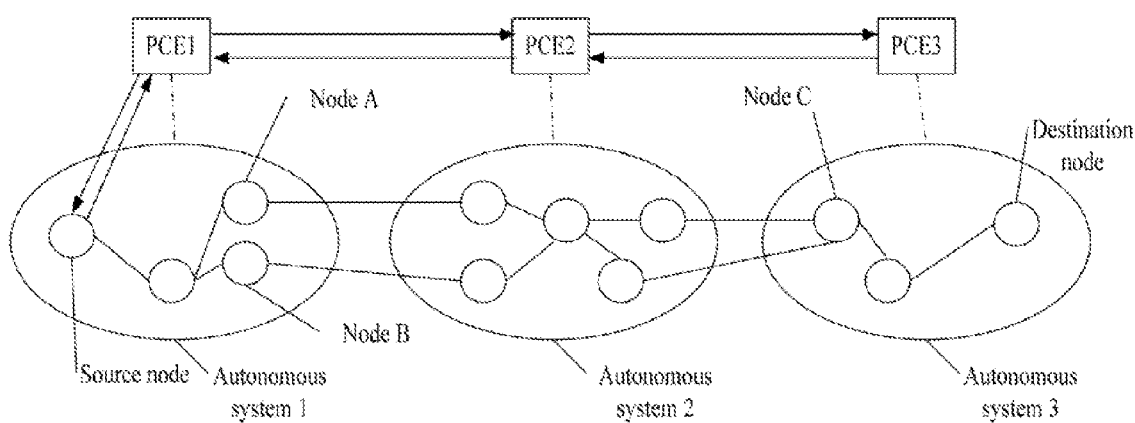
FIG. 1 shows a PCE network architecture.

The foregoing method is elaborated below through an embodiment, supposing that the network architecture is the network architecture illustrated in FIG. 1. In this embodiment, it is still assumed that the domain covered by a PCE is an autonomous system: PCE 1 is responsible for autonomous system 1, PCE 2 is responsible for autonomous system 2, and PCE 3 is responsible for autonomous system 3. The source node is in autonomous system 1 covered by PCE 1 and the destination node is in autonomous system 2 covered by PCE 3. The method implemented in the foregoing architecture may include the following steps:

The source node serves as a PCC and sends a path computation request to PCE 1. The path computation request may carry the destination node information.

After receiving the path computation request, PCE 1 determines the PCE sequence between PCE 1 and PCE 3 corresponding to the destination node by using the stored network topology information, determines the confluent PCE, namely, PCE 2, in the sequence according to the PCE sequence, and sends the PCE sequence to the next PCE, namely, PCE 2, in the sequence. PCE 2 forwards the PCE sequence to PCE 3, thus setting up a PCEP connection between PCE 1 and PCE 3.

The determined confluent PCE flag is carried in path computation request of PCE 1, and PCE 1 sends the path computation request to the PCE in the sequence by using the PCEP connection. After receiving the path computation request, each PCE judges whether the PCE itself is a confluent PCE according to the confluent PCE flag in the request.

Meanwhile, after receiving the path computation request, PCE 1 begins to compute the shortest path, namely, VSPT, in the domain covered by PCE 1, where: the VSPT uses the source node as a root node and uses the egress border node of autonomous system 1 as a leaf node, the height directed to the leaf node is 2, and the egress border node of the leaf node is the border node connected with autonomous system 2, for example, node A or node B in the schematic diagram. The computation result is sent to PCE 2.

After receiving the path computation request, PCE 3 begins to compute the shortest path, namely, VSPT, in the domain covered by PCE 3, where: the VSPT uses the destination node as a root node and uses the ingress border node of autonomous system 3 as a leaf node, the height directed to the leaf node is 2, and the ingress border node of the leaf node is the border node connected with autonomous system 2, for example, node C in the schematic diagram. The computation result is sent to PCE 2.

After receiving the computation results from PCE 1 and PCE 3, PCE 2 use the computation results to compute the shortest path from the source node to the destination node by using the received computation results, and sends the computed shortest path information to PCE 1.

After receiving the shortest path information, PCE 1 may return the shortest path information to the source node. Now, the process of obtaining the path information is completed.

Figure 3:
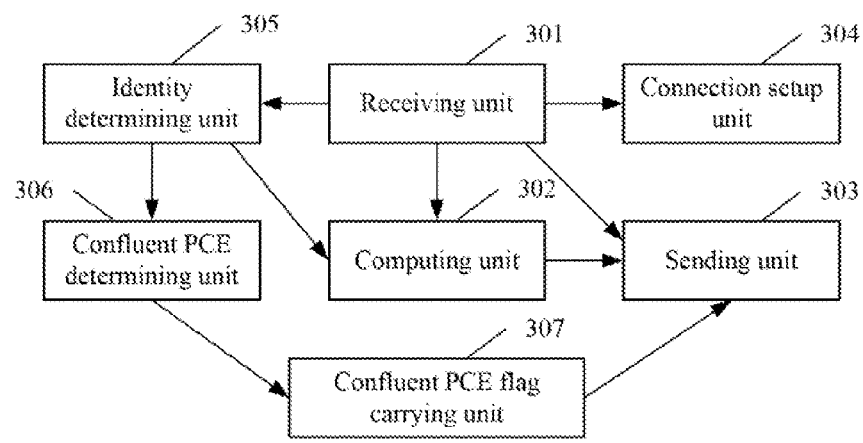
FIG. 3 shows a structure of a PCE according to an embodiment of the present invention.

FIG. 3 shows a structure of a PCE disclosed in an embodiment of the present invention. As shown in FIG. 3, the PCE may include:

a receiving unit 301, adapted to receive a path computation request or a computation result;

a computing unit 302, adapted to perform any of the following operations: a. compute the shortest path from the source node to the egress border node in the domain covered by the PCE after the receiving unit 301 receives a path computation request; b. compute the shortest path from the destination node to the ingress border node in the domain covered by the PCE after the receiving unit 301 receives the path computation request; c. compute the shortest path from the source node to the egress border node in the domain covered by the PCE by using the computation result received by the receiving unit 301 and sent by the previous-hop PCE; d. compute the shortest path from the destination node to the ingress border node in the domain covered by the PCE by using the computation result received by the receiving unit 301 and sent by the next-hop PCE; and e. compute the shortest path from the source node to the destination node by using the computation result received by the receiving unit and sent by the previous-hop PCE and the computation result received by the receiving unit and sent by the next-hop PCE; and a sending unit 303, adapted to perform any of the following operations: f. send the shortest path from the source node to the egress border node in the domain covered by the PCE as a result of computation by the computing unit 302 to the next-hop PCE; g. send the shortest path from the destination node to the ingress border node in the domain covered by the PCE to the previous-hop PCE; and h. send the shortest path between the source node and the destination node to the source PCE.

The PCE may further include a connection setup unit 304.

The receiving unit 301 is further adapted to receive a PCEP message.

The sending unit 303 is further adapted to send the PCEP message to the next-hop PCE.

The connection setup unit 304 is adapted to set up a PCEP connection by using the PCEP message received by the receiving unit 301.

The PCE may further include:

an identity determining unit 305, adapted to perform any of the following operations: i. if the PCEP message carries no PCE sequence, determine the PCE as a source PCE, and trigger the computing unit 302 to perform operation a; j. according to the PCE sequence carried in the PCEP message, determine the PCE as a destination PCE, and trigger the computing unit 302 to perform operation b; k. according to the confluent PCE flag carried in the PCEP message or the path computation request, determine the PCE as a confluent PCE, and trigger the computing unit 302 to perform operation e; h. according to the PCE sequence and the confluent PCE flag, determine that the PCE is located between the source PCE and the confluent PCE, and trigger the computing unit 302 to perform operation c; and determine that the PCE is located between the destination PCE and the confluent PCE, and trigger the computing unit 302 to perform operation d.

The PCE may further include:

a confluent PCE determining unit 306, adapted to determine the confluent PCE in the PCEP connection according to a predetermined PCE sequence; and a confluent PCE flag carrying unit 307, adapted to carry the determined confluent PCE flag in the path computation request or the PCEP message sent by the sending unit 303.

The information interaction between units and the operation process of the PCE apparatus are the same as the counterpart contents described in the method embodiment above, and are not repeated here any further.

Figure 4:
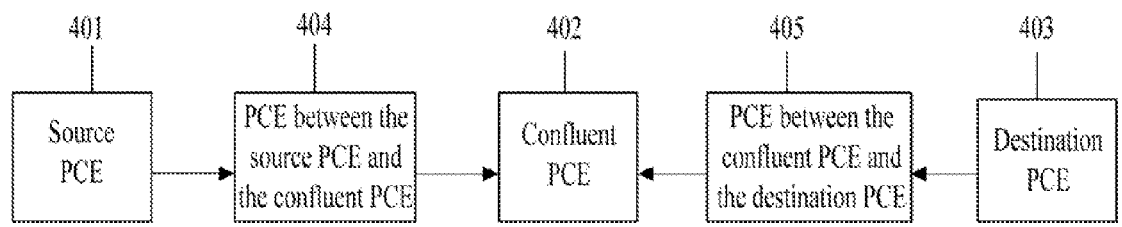
FIG. 4 shows a structure of a system for obtaining path information according to an embodiment of the present invention.

FIG. 4 shows a structure of a system for obtaining path information in an embodiment of the present invention. As shown in FIG. 4, the system may include:

a source PCE 401, adapted to: compute the shortest path from the source node to the egress border node in the domain covered by the source PCE after receiving a path computation request, and send the computation result to the next-hop PCE;

a confluent PCE 402, adapted to: compute the shortest path from the source node to the destination node according to the received computation results after receiving the computation results from the previous-hop PCE and the next-hop PCE, and send the computed shortest path information to the source PCE 401; and a destination PCE 403, adapted to: compute the shortest path from the destination node to the ingress border node in the domain covered by the destination PCE after receiving a path computation request, and send the computation result to the previous-hop PCE.

Besides, at least one PCE 404 may be set between the source PCE 401 and the confluent PCE 402 in the system. The PCE 404 is adapted to: receive the computation result of the previous-hop PCE, compute the shortest path from the source node to the egress border node in the domain covered by the PCE 404, and send the computation result to the next-hop PCE.

There may be one or more PCEs 404 between the source PCE and the confluent PCE 402.

At least one PCE 405 may be set between the confluent PCE 402 and the destination PCE 403 in the system. The PCE 405 is adapted to: receive the computation result of the next-hop PCE, compute the shortest path from the destination node to the ingress border node in the domain covered by the PCE 405, and send the computation result to the previous-hop PCE.

There may be one or more PCEs 405 between the destination PCE and the confluent PCE.

The information interaction between the PCEs and the operation process of the PCE in the foregoing system are the same as the counterpart contents described in the method embodiment above, and are not repeated here any further.

In the technical solution under the present invention, all the PCEs from the source PCE to the confluent PCE compute the shortest path from the source node to the egress border node of the domain covered by the respective PCE one by one, and send the computation result to the next-hop PCE until the confluent PCE. Meanwhile, all the PCEs from the destination PCE to the confluent PCE compute the shortest path from the destination node to the ingress border node of the domain covered by the respective PCE one by one, and send the computation result to the previous-hop PCE until the confluent PCE. After receiving computation results from the previous-hop PCE and the next-hop PCE, the confluent PCE computes the shortest path between the source node and the destination node, and sends the shortest path to the source PCE. That is, the computation of the shortest path on both sides of the confluent PCE occurs simultaneously, and the transfer of the computation result occurs simultaneously on both sides. Moreover, the confluent PCE computes the shortest path from the source node to the destination node, and transmits the computation result to the source PCE. By comparison, in the prior art, the PCEs which start from the destination PCE compute the shortest path one by one and transmit the computation result to the previous-hop PCE until the source PCE. Evidently, the method under the present invention shortens the time of computing the shortest path and transmitting the computation result, and shortens the total time required for obtaining the path information.

Through the foregoing description about the embodiments of the present invention, those skilled in the art are clearly aware that the present invention may be implemented by means of hardware, or by means or software in addition to a necessary universal hardware platform. Therefore, the technical solution under the present invention may be embodied as a software product. The software product may be stored in a non-volatile memory medium (such as CD-ROM, USB flash disk, and mobile hard disk), and may include several instructions that enable a computer device (such as personal computer, server, and network device) to perform the methods provided in the embodiments of the present invention.

Although the invention has been described through several preferred embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the claims or their equivalents.

What is claimed is:

1. A method for obtaining path information, comprising:
receiving, by a source Path Computation Element (PCE), a path computation request from a Path Computation Client (PCC);
sending a Path Computation Element Protocol (PCEP) message to a next-hop PCE in a PCE sequence, so as to enable the PCEP message to arrive at a destination PCE and enable a PCEP connection to be set up between the source PCE and the destination PCE;
determining a confluent PCE in the PCEP connection according to the PCE sequence;
sending the path computation request to the next-hop PCE in the PCE sequence according to the PCEP connection so as to enable the path computation request to arrive at the destination PCE;
computing, by the source PCE, a shortest path from a source node to an egress border node in a domain covered by the source PCE after receiving the path computation request, and sending a computation result to the next-hop PCE; and computing, by the next-hop PCE, a shortest path from the source node to an egress border node in a domain covered by the next-hop PCE by using the received computation result, and sending a computation result to another next-hop PCE subsequent to the next-hop PCE until the confluent PCE;
computing, by the destination PCE, a shortest path from a destination node to an ingress border node in a domain covered by the destination PCE after receiving the path computation request, and sending the computation result to a previous-hop PCE; computing, by the previous-hop PCE, a shortest path from the destination node to an ingress border node in a domain covered by the previous-hop PCE by using the received computation result, and sending a computation result to another previous-hop PCE prior to this previous-hop PCE until the confluent PCE; and
computing, by the confluent PCE, a shortest path from the source node to the destination node according to received computation results from a previous-hop PCE and a next-hop PCE, and sending computed shortest path information to the source PCE.

2. The method of claim 1, wherein:
the determining of the confluent PCE in the PCEP connection comprises: determining a PCE in the middle of the PCEP sequence as the confluent PCE.

3. The method of claim 1, further comprising:
carrying a confluent PCE flag in the PCEP message or the path computation request; and
judging, by each PCE in the PCEP sequence, whether the PCE itself is the confluent PCE according to the confluent PCE flag.

4. The method of claim 1, further comprising:
the PCEP message is a request parameter (RP) object message that carries a bidirectional cross-domain path computation flag.

5. The method of claim 4, further comprising:
returning an error report message to the source PCE after receiving the RP object message that carries the bidirectional cross-domain path computation flag if a PCE in the PCE sequence does not support bidirectional cross-domain path computation; and
determining, by the source PCE, a PCE sequence reachable between the source PCE and the destination PCE again after receiving the error report message.

6. A method for obtaining path information, comprising:
computing, by a source Path Computation Element (PCE), a shortest path from a source node to an egress border node in a domain covered by the source PCE after receiving a path computation request, and sending a computation result to a next-hop PCE; and computing, by the next-hop PCE, a shortest path from the source node to an egress border node in a domain covered by the next-hop PCE by using the received computation result, and sending a computation result to another next-hop PCE subsequent to the next-hop PCE until a confluent PCE;

computing, by a destination PCE, a shortest path from a destination node to an ingress border node in a domain covered by the destination PCE after receiving the path computation request, and sending the computation result to a previous-hop PCE; computing, by the previous-hop PCE, a shortest path from the destination node to an ingress border node in a domain covered by the previous-hop PCE by using the received computation result, and sending a computation result to another previous-hop PCE prior to this previous-hop PCE until the confluent PCE; and computing, by the confluent PCE, a shortest path from the source node to the destination node according to received computation results from a previous-hop PCE and a next-hop PCE, and sending computed shortest path information to the source PCE; wherein:

the computing of the shortest path from the source node to the egress border node in the domain covered by the source PCE comprises: computing a Virtual Shortest Path Tree (VSPT) which uses the source node as a root node and uses the egress border node in the domain covered by the source PCE as a leaf node, wherein height directed to the leaf node of the VSPT is 2, and the egress border node in the domain covered by the source PCE is a border node connected with the domain covered by the next-hop PCE in the PCE sequence.

7. A method for obtaining path information, comprising:

computing, by a source Path Computation Element (PCE), a shortest path from a source node to an egress border node in a domain covered by the source PCE after receiving a path computation request, and sending a computation result to a next-hop PCE; and computing, by the next-hop PCE, a shortest path from the source node to an egress border node in a domain covered by the next-hop PCE by using the received computation result, and sending a computation result to another next-hop PCE subsequent to the next-hop PCE until a confluent PCE;

computing, by a destination PCE, a shortest path from a destination node to an ingress border node in a domain covered by the destination PCE after receivin the path computation request, and sending the computation result to a previous-hop PCE; computing, by the previous-hop PCE, a shortest path from the destination node to an ingress border node in a domain covered by the previous-hop PCE by using the received computation result, and sending a computation result to another previous-hop PCE prior to this previous-hop PCE until the confluent PCE; and computing, by the confluent PCE, a shortest path from the source node to the destination node according to received computation results from a previous-hop PCE and a next-hop PCE, and sending computed shortest path information to the source PCE; wherein:

the computing of the shortest path from the source node to the egress border node in the domain covered by the next-hop PCE comprises: computing a Virtual Shortest Path Tree (VSPT) which uses the source node as a root node and uses the egress border node in the domain covered by the next-hop PCE as a leaf node, wherein height directed to the leaf node of the VSPT is 2, and the egress border node in the domain covered by the next-hop PCE is a border node connected with the domain covered by the another next-hop PCE in the PCE sequence.

8. A method for obtaining path information, comprising:

computing, by a source Path Computation Element (PCE), a shortest path from a source node to an egress border node in a domain covered by the source PCE after receiving a path computation request, and sending a computation result to a next-hop PCE; and computing, by the next-hop PCE, a shortest path from the source node to an egress border node in a domain covered by the next-hop PCE by using the received computation result, and sending a computation result to another next-hop PCE subsequent to the next-hop PCE until a confluent PCE;

computing, by a destination PCE, a shortest path from a destination node to an ingress border node in a domain covered by the destination PCE after receiving the path computation request, and sending the computation result to a previous-hop PCE; computing, by the previous-hop PCE, a shortest path from the destination node to an ingress border node in a domain covered by the previous-hop PCE by using the received computation result, and sending a computation result to another previous-hop PCE prior to this previous-hop PCE until the confluent PCE; and computing, by the confluent PCE, a shortest path from the source node to the destination node according to received computation results from a previous-hop PCE and a next-hop PCE, and sending computed shortest path information to the source PCE; wherein:

the computing of the shortest path from the destination node to the ingress border node in the domain covered by the destination PCE comprises: computing a Virtual Shortest Path Tree (VSPT) which uses the destination node as a root node and uses the ingress border node in the domain covered by the destination PCE as a leaf node, wherein height directed to the leaf node of the VSPT is 2, and the ingress border node in the domain covered by the destination PCE is a border node connected with the domain covered by the previous-hop PCE in the PCE sequence.

9. A method for obtaining path information, comprising:

computing, by a source Path Computation Element (PCE), a shortest path from a source node to an egress border node in a domain covered by the source PCE after receiving a path computation request, and sending a computation result to a next-hop PCE; and computing, by the next-hop PCE, a shortest path from the source node to an egress border node in a domain covered by the next-hop PCE by using the received computation result, and sending a computation result to another next-hop PCE subsequent to the next-hop PCE until a confluent PCE;

computing, by a destination PCE, a shortest path from a destination node to an ingress border node in a domain covered by the destination PCE after receiving the path computation request, and sending the computation result to a previous-hop PCE; computing, by the previous-hop PCE, a shortest path from the destination node to an ingress border node in a domain covered by the previous-hop PCE by using the received computation result, and sending a computation result to another previous-hop PCE prior to this previous-hop PCE until the confluent PCE; and computing, by the confluent PCE, a shortest path from the source node to the destination node according to received computation results from a previous-hop PCE and a next-hop PCE, and sending computed shortest path information to the source PCE; wherein:

the computing of the shortest path from the destination node to the ingress border node in the domain covered by the previous-hop PCE comprises: computing a Virtual Shortest Path Tree (VSPT) which uses the destination node as a root node and uses the ingress border node in the domain covered by the previous-hop PCE as a leaf node, wherein height directed to the leaf node of the VSPT is 2, and the ingress border node in the domain covered by the previous-hop PCE is a border node connected with the domain covered by the another previous-hop PCE in the PCE sequence.

* * * * *